United States Patent [19]

Nitao et al.

[11] Patent Number: 4,581,923
[45] Date of Patent: Apr. 15, 1986

[54] SINGLE DEGREE OF FREEDOM MACHINE IDENTIFICATION

[75] Inventors: John J. Nitao, Castro Valley; James L. Wiederrich, Lodi, both of Calif.

[73] Assignee: FMC Corporation, Chicago, Ill.

[21] Appl. No.: 633,328

[22] Filed: Jul. 23, 1984

[51] Int. Cl.⁴ .......................................... G01M 15/00
[52] U.S. Cl. ...................................... 73/116; 73/660; 364/566
[58] Field of Search ................ 73/660, 862.08, 862.19, 73/116, 862, 862.28; 364/566

[56] References Cited

U.S. PATENT DOCUMENTS 4,489,617  12/1984  Smith ............................... 73/862.19

FOREIGN PATENT DOCUMENTS 205998  1/1984  German Democratic Rep. ... 73/116
2075196  11/1981  United Kingdom ............. 73/862.19

Primary Examiner—Jerry W. Myracle
Attorney, Agent, or Firm—H. M. Stanley; R. B. Megley

[57] ABSTRACT

A method is presented, together with variations thereof, which provides for identifying single degree of freedom machine operating characteristics from machine power transfer shaft torque and angular velocity measurements, wherein solutions are determined within the physical coordinate domain. Apparatus is disclosed which provides for variation in torque and angular velocity at the power transfer shaft and the shaft is accessible, so that independent measurements may be made. The determination of machine characteristics is useful for verification of analysis, diagnostics, or on-line monitoring for conformance to machine model characteristics.

41 Claims, 2 Drawing Figures

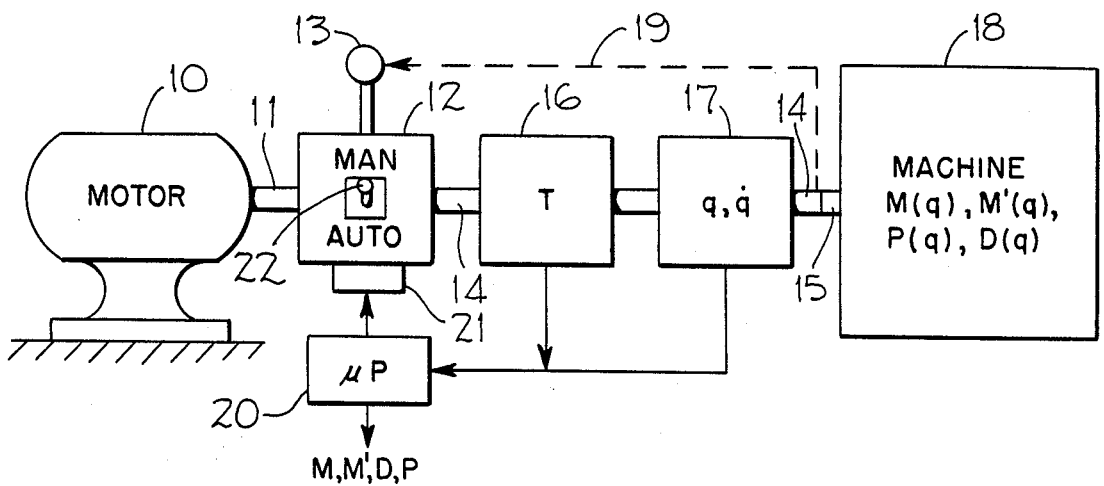
FIG_1
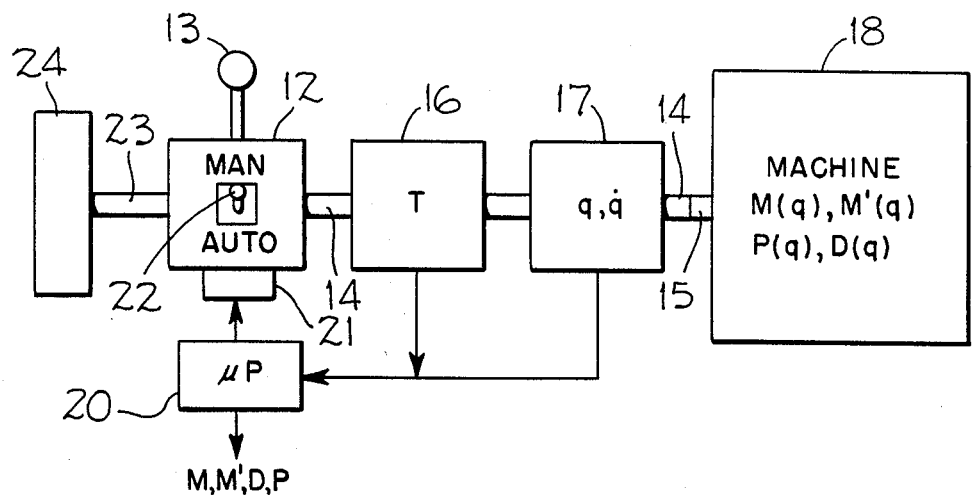
FIG_2

4,581,923

SINGLE DEGREE OF FREEDOM MACHINE IDENTIFICATION

BACKGROUND OF THE INVENTION

1. Field of the Invention

This invention relates to apparatus and method for determining characteristics of a mechanical system, and more particularly to such apparatus and methods for determining kinetic energy, potential energy and dissipation functions for a single degree of freedom machine.

2. Description of the Prior Art

The general form of a nonlinear differential equation governing the motion of any single degree of freedom holonomic system is known. The characteristics of a scleronomic holonomic system are defined in the text entitled Dynamics, authored by Thomas R. Kane, published by Holt, Rinehart, and Winston, Inc., copyright 1968, pages 13–15. Given certain information regarding the mechanical system, other system information may be found. Given system parameters and desired response, the required input to the system may be determined. Given system input and desired response, required system parameters may be determined. Given system parameters and input, resulting response may be determined. If the system input and response are measured, system parameters may be determined.

The utility of the last mentioned approach, identification of system parameters, has only recently been recognized. In U.S. patent application Ser. No. 413,926, filed Sept. 1, 1982 now U.S. Pat. No. 4,457,165 and assigned to the Assignee of the instant application, it was disclosed that determination of kinetic energy, potential energy and dissipation functions relative to a particular mechanical system formed the basis for dynamic analysis of the system. When the response of a single degree of freedom machine is observed while being driven by a forced periodic input torque, information is obtained whereby the aforementioned functions may be determined. It was therein stated that such determinations may be utilized in applications relating to machinery development, quality control and machine diagnosis. This disclosure was limited by the requirement of effecting solutions in the frequency domain and therefore by a requirement that machine shaft excitation be in the form of a known oscillatory steady state quantity.

A recent work relates to experimentally improving the balancing of a mechanism through a form of mechanism identification. Tricamo, S. J., and Lowen, G. G., "A New Concept For Force Balancing Machines For Planar Linkages, Part I: Theory; Part II: Application to Four-Bar Linkage and Experiment", ASME Journal of Mechanical Design, Volume 103, No. 3, July 1981, pages 637–642 and Volume 103, No. 4, October 1981, pages 784–792, respectively. In this work it was found that crankshaft speed variations could not be ignored. A theory for identification of sources of kinematic errors in planar mechanisms was presented by Dubowsky, S., Maatuk, J., and Perreira, N. D., "A Parameter Identification Study Of Kinematic Errors In Planar Mechanisms", ASME Journal of Engineering For Industry, Volume 97, No. 2, May 1975, pages 635–642.

SUMMARY OF THE INVENTION

A method is disclosed herein for analyzing the characteristics of a cyclical machine having an accessible power transfer member. The method includes the steps of operating the machine through a series of the operating cycles and obtaining data related to power transfer member force, position and velocity during separate machine operating cycles. The method further includes the step of effecting a solution in the coordinate domain for machine kinetic energy, potential energy and dissipation characteristics utilizing the obtained data.

The invention further relates to apparatus for driving a substantially single degree of freedom holonomic mechanical system through a power transfer member and for sensing system characteristic. The apparatus includes a drive motor having an output drive shaft. A variable transmission means is utilized for coupling the output drive shaft to the power transfer member. Means for sensing torque at the power transfer member, means for detecting power transfer member drive position, and means for obtaining power transfer member driven speed are provided. Feedback means is coupled between the means for sensing torque, detecting drive position and obtaining driven speed and the variable transmission means. Consequently the drive motor may impose distinct torque and driven speed conditions on the power transfer member.

Further, the invention relates to apparatus for determining the characteristics of a substantially single degree of freedom holonomic mechanical system having a contained power source coupled to a system power transfer member. Means for providing a load coupled to the power transfer member is present together with variable transmission means disposed between the load means and the power transfer member. Means for sensing torque at the power transfer member, means for detecting power transfer member drive position, and means for obtaining power transfer member speed are also provided. Feedback means is coupled between the means for sensing torque, detecting drive position and obtaining driven speed and the variable transmission means so that the means for providing a load may impose distinct torque and speed conditions on the power transfer member throughout operating cycles and during separate operating cycles.

BRIEF DESCRIPTION OF THE DRAWINGS

FIG. 1 is a block diagram displaying the apparatus for driving a single degree of freedom mechanical system according to the present invention.

FIG. 2 is a block diagram displaying apparatus for determining the characteristics of a single degree of freedom mechanical system having a contained power source according to the present invention.

DESCRIPTION OF THE PREFERRED EMBODIMENTS

The method of machine identification disclosed herein is based upon determination of the kinetic energy, potential energy, and dissipation functions for the machine. For the class of machines considered, the foregoing characteristics are periodic functions of the position of a machine power transfer member, such as a power transfer shaft or crankshaft extending therefrom. The machines in the class to be considered are restricted to single degree of freedom, scleronomic, holonomic mechanical systems. It is further required that the mechanical system power transfer member or shaft be accessible so that a number of different operating conditions may be observed. A generalized symbol is used for power transfer member position, $q$, for power transfer shaft angular position in this instance. Another generalized symbol is used for power transfer member speed, q, shaft angular velocity in this instance. q must be a monotonic function and q must be non-zero. The monotonic characteristic requires that the shaft position be unidirectional over the region of observation. Since the power transfer member or shaft is accessible, driving torque T, as a function of shaft angle q, and shaft angular velocity q as a function of q can be measured and the quantity q'(q) as defined hereinafter can be calculated.

It is further presumed that all of the unknown active forces in the machine are representable by suitable kinetic energy, potential energy and dissipation functions taking the following forms:

$M(q)\ \dot{q}^2$ = kinetic energy
$P(q)$ = potential energy
$D(q)\ \dot{q}^2/2$ = dissipation function All of the characteristics of such a machine are periodic functions of the generalized coordinate, shaft position q, having a period of $2\pi$. Further, for such machines the coordinate plane representation of the equation of motion can be written as follows:

$$(M\dot{q}^2)' + Dq + P = T \qquad (1)$$

where $' = d/dq$.

The three functions M, P' and D completely define the dynamic properties of the machine or mechanical system for most purposes and are periodic functions of q of period $2\pi$. The generalized method of machine identification disclosed herein includes the determination of M, P' and D from observations of q(q) and T(q), wherein calculations to implement solutions are carried out in the physical coordinate plane and wherein excitation of the drive transfer member may be periodic, but may also be aperiodic in some instances.

In a deterministic method of solution for the mechanical system characteristics, it will be shown that precisely three observations for q(q) and T(q) are necessary to uniquely determine the three general functions M, P' and D which are all periodic in q. Further it will be shown that two conditions are necessary and sufficient to obtain the aforementioned unique determinations.

The first necessary condition is that the determinant $d_1$ shall not vanish for any q; that is:

$$d_1 = \begin{vmatrix} \dot{q}_1^2 & \dot{q}_1 & 1 \\ \dot{q}_2^2 & \dot{q}_2 & 1 \\ \dot{q}_3^2 & \dot{q}_3 & 1 \end{vmatrix} \qquad (2)$$

$$= (\dot{q}_1 - \dot{q}_2)(\dot{q}_2 - \dot{q}_3)(\dot{q}_1 - \dot{q}_3) \neq 0$$

Additionally a condition must be satisfied such that:

$$\int_o^{2\pi} \frac{d_2}{d_1} dq \neq 0 \qquad (3)$$

$$d_2 = \begin{vmatrix} \dot{q}_1^{2'} & \dot{q}_1 & 1 \\ \dot{q}_2^{2'} & \dot{q}_2 & 1 \\ \dot{q}_3^{2'} & \dot{q}_3 & 1 \end{vmatrix}$$

$$= (\dot{q}_1^2 - \dot{q}_2^2)'(\dot{q}_2 - \dot{q}_3) + (\dot{q}_3^2 - \dot{q}_2^2)'(\dot{q}_1 - \dot{q}_2).$$

Equations (2) and (3) are necessary and sufficient conditions for the existence of unique functions M, P' and D, periodic in q. A solution can then proceed directly from equation (1) from which the following set of three equations in three unknowns may be obtained from three independent observations (observations taken throughout a power transfer shaft period of $2\pi$ and taken in three separate such periods.)

$$\left. \begin{array}{l} M'\dot{q}_1^2 + D\dot{q}_1 + P' = T_1 - M\dot{q}_1^{2'} \\ M'\dot{q}_2^2 + D\dot{q}_2 + P' = T_2 - M\dot{q}_2^{2'} \\ M'\dot{q}_3^2 + D\dot{q}_3 + P' = T_3 - M\dot{q}_3^{2'} \end{array} \right\} \qquad (5)$$

The simultaneous differential equations (5) are solved for the unknowns M, P' and D conveniently by Kramer's rule:

$$M' = \frac{\begin{vmatrix} T_1 - M\dot{q}_1^{2'} & \dot{q}_1 & 1 \\ T_2 - M\dot{q}_2^{2'} & \dot{q}_2 & 1 \\ T_3 - M\dot{q}_3^{2'} & \dot{q}_3 & 1 \end{vmatrix}}{d_1}$$

Letting:

$$d_3 = \begin{vmatrix} T_1 & \dot{q}_1 & 1 \\ T_2 & \dot{q}_2 & 1 \\ T_3 & \dot{q}_3 & 1 \end{vmatrix}$$

Then:

$$d_1 M' + d_2 M = d_3 \qquad (6)$$

Equation (6) is an expansion of M' where $d_3$ is the quantity indicated and therefore only M remains as the unknown variable. It may be seen from the foregoing that $d_1$ cannot be equivalent to O, or M' would be infinite and/or nonunique for practical purposes. Thus, the condition expressed in equation (2) is required.

The requirement of the second condition equation (3), may be derived utilizing the known periodicity of M. The solution to equation (6) may be expressed as:

$$M = \exp\left(-\int_o^q \frac{d_2}{d_1} dq\right) \left[ M(O) + \int_o^q \frac{d_3}{d_1} \exp\left(\int_o^u \frac{d_2}{d_1} dq\right) du \right]$$

where u is a dummy variable of integration.

The initial condition, M(O), may be determined from the periodicity requirement, where M(O) equals M($2\pi$), resulting in:

$$M(O) = \frac{s}{1-s} \left[ \int_o^{2\pi} \frac{d_3}{d_1} \exp\left(\int_o^u \frac{d_2}{d_1} dq\right) du \right]$$

Where:

$$s = \exp\left(-\int_o^{2\pi} \frac{d_2}{d_1} dq\right)$$

Therefore:

$$M(q) = \frac{s}{1-s}\left[\int_o^{2\pi} \frac{d_3}{d_1} \exp\left(\int_q^u \frac{d_2}{d_1} dq\right) du\right] +$$

$$\int_o^q \frac{d_3}{d_1} \exp\left(\int_q^u \frac{d_2}{d_1} dq\right) du$$

The foregoing presumes that s does not equal one, which leads to the second condition as expressed in equation (3).

Having solved for kinetic energy M, D and P' are thereafter easily obtained. From the first two equations (5), we have by Cramer's rule:

$$D = \frac{\begin{vmatrix} T_1 - M\dot{q}_1{}^2)' & 1 \\ T_2 - M\dot{q}_2{}^2)' & 1 \end{vmatrix}}{(\dot{q}_1 - \dot{q}_2)} \tag{8}$$

and $$P' = \frac{\begin{vmatrix} \dot{q}_1 T_1 - (M\dot{q}_1{}^2)' \\ \dot{q}_2 T_2 - (M\dot{q}_2{}^2)' \end{vmatrix}}{(\dot{q}_1 - \dot{q}_2)} \tag{9}$$

which two equations result from two independent equations in two unknowns.

In the foregoing, equations (2), (3), (7), (8), and (9) summarize the mathematical manipulation required for obtaining results using what is termed the deterministic method of solution. Apart from the conditions set forth in equations (2) and (3), it should be noted that the deterministic method of solution is restricted to three observations taken in three separate machine operating cycles for each solution. The observations consist of measurement of torque T and power transfer shaft angular velocity q over the entire operating cycle. Since this method of solution is somewhat sensitive to measurement errors and noise, it is prudent to effect a number of solutions from separate sets of three observations as defined hereinbefore, and to thereafter average the solutions for M, P' and D. Measurements are taken throughout the entire machine cycle when collecting data for this particular method of effecting a solution for machine characteristics, wherein the frequency of measurement within an operating cycle is dependent upon the desired resolution within the machine cycle. While somewhat less convenient, it may be seen that measurement errors and noise may also be reduced by averaging the collected data for torque and power transfer shaft angular velocity obtained from repeated test conditions prior to entering the mathematical solution process. It should further be noted that the variation in the measured quantities, torque T and angular velocity q may be periodic and synchronous with the shaft angle q, or may be aperiodic or transient.

A least squares formulation of the data may be used which appears to be less sensitive to torque and power transfer shaft angular velocity measurement errors and noise. In this method of solution in a coordinate plane or domain, the variation in torque T and shaft speed $\dot{q}$ must be periodic functions of q. The periodicity is synchronous with the machine operating cycle. Further, at least one subset of data collected from measurements of T and $\dot{q}$ must satisfy the conditions represented by equations (2) and (3). The measurements and data obtained therefrom are not restricted to only three observations in this approach. Each of the observations consists of a measurement of T and $\dot{q}$ over the entire machine cycle or range, q.

Consider the set of equations represented by:

$$A\bar{x} = \bar{y}$$

Where:
A is a matrix of linear operators
$\bar{x}$ is a vector of unknown functions M, P' and D.
$\bar{y}$ is a vector of measured torque functions T (q).

In order to develop the least squares formulation the norm of a vector function is introduced over the range of q:

$$\|\bar{f}\|^2 = \int_o^{2\pi} \bar{f}^T \bar{f} dq = \int_o^{2\pi} \bar{f}^2 dq,$$

where $\bar{f}$ is an arbitrary admissible vector function of q. The resulting inner product is:

$$(\bar{f}, \bar{g}) = \int_o^{2\pi} \bar{f}^T \bar{g} dq = \int_o^{2\pi} \bar{f} \cdot \bar{g} dq,$$

where $\bar{f}$ and $\bar{g}$ are arbitrary admissible vector functions of q. Letting E be the norm of the error between $\bar{x}$ and $\bar{y}$ with respect to A such that:

$$E = \|A\bar{x} - \bar{y}\|^2$$

and then requiring that the error E be minimized (i.e., $\delta E = 0$ for all admissible $\delta \bar{x}$, where $\delta E$ is the variation in E due to $\delta \bar{x}$ and $\delta \bar{x}$ is an arbitrary admissible variation in $\bar{x}$) such that:

$$E + \delta E = \|A\bar{x} - \bar{y}\|^2 + 2(A\bar{x} - \bar{y}, A\delta\bar{x}) + 0(\|\delta\bar{x}\|^2)$$

and then neglecting higher order terms:

$$\delta E = 2(A\bar{x} - \bar{y}, A\delta\bar{x})$$

Assuming that a transpose operator, $A^t$, exists such that:

$$(\bar{f}, A\bar{g}) = (A^t \bar{f}, \bar{g})$$

Then $$\delta E = 2(A^t A \bar{x} - A^t \bar{y}, \delta \bar{x})$$

and the requirement that $\delta E = 0$ for all admissible $\delta \bar{x}$ leads to the least squares formulation:

$$A^t A \bar{x} = A^t \bar{y} \tag{10}$$

Referring to equations (5) the application of the least squares formulation follows:

$$\bar{x} = \begin{bmatrix} M \\ D \\ P \end{bmatrix} \text{ and } \bar{y} = \begin{bmatrix} T_1 \\ . \\ . \\ . \\ T_n \end{bmatrix}$$

$$A = \begin{bmatrix} (\dot{q}_1^2*)' & \dot{q}_1 & 1 \\ . & . & . \\ . & . & . \\ . & . & . \\ (\dot{q}_n^2*)' & \dot{q}_n & 1 \end{bmatrix}$$

where $(\dot{q}^2*)'f=(\dot{q}^2f)'$ for any admissible scalar function $f(q)$ and $n \geq 3$.

For periodic functions scalar f and g the required transpose of the operator $(\dot{q}^2*)'$ can be found by integrating by parts provided q is also periodic with respect to $\dot{q}$. The transpose operator, $A^t$, is then:

$$A^t = \begin{bmatrix} -\dot{q}_1^2(*)' & \ldots & -\dot{q}_n^2(*)' \\ \dot{q}_1 & \ldots & \dot{q}_n \\ 1 & \ldots & 1 \end{bmatrix}$$

and the resulting least squares formulation for periodic functions is, from an expansion of equation (10):

$$\left. \begin{array}{l} \Sigma \dot{q}_i^2 (\dot{q}_i^2 M)'' + \Sigma \dot{q}_i^2 (\dot{q}_i D)' + \Sigma \dot{q}_i^2 P' = \Sigma \dot{q}_i^2 T_i \\ \Sigma \dot{q}_i (\dot{q}_i^2 M)' + \Sigma \dot{q}_i^2 D + \Sigma \dot{q}_i P' = \Sigma \dot{q}_i T_i \\ \Sigma (\dot{q}_i^2 M)' + \Sigma \dot{q}_i D + nP = \Sigma T_i \end{array} \right\} \quad (11)$$

where subscript i denotes the general observation number with its associated operating conditions.

Expanding equation (11) and using simplifying functions of q $a_i$, $b_i$, $c_i$, $g_i$, $h_i$ and $k_i$ provides:

$$k_1 M'' + k_2 M' + K_3 M = k_4 \quad (12)$$

where:

$k_1 = a_1 - a_4 g_1 - a_6 h_1$ $k_2 = a_2 - a_4(g_1' + g_2) - a_5 g_1 - a_6(H_1' + h_2)$ $k_3 = a_3 - a_4 g_2' - a_5 g_2 - a_6 h_2'$ $k_4 = a_8 - a_4 g_3' - a_5 g_3 - a_6 h_3'$ where:

$a_1 = \Sigma \dot{q}_i^4$
$a_2 = 2\Sigma \dot{q}_i^2 \dot{q}_i^{2'}$, $b_2 = \Sigma \dot{q}_i^3$, $c_2 = \Sigma \dot{q}_i^2$
$a_3 = \Sigma \dot{q}_i^2 \dot{q}_i^{2''}$, $b_3 = \Sigma \dot{q}_i \dot{q}_i^{2'}$, $c_3 = \Sigma \dot{q}_i^{2'}$
$a_4 = \Sigma \dot{q}_i^3$
$a_5 = \Sigma \dot{q}_i^2 \dot{q}_i'$, $b_5 = \Sigma \dot{q}_i^2$, $c_5 = \Sigma \dot{q}_i$
$a_6 = \Sigma \dot{q}_i^2$ $b_7 = \Sigma \dot{q}_i$, $c_7 = n$
$a_8 = \Sigma \dot{q}_i^2 T_i$, $b_8 = \Sigma \dot{q}_i T_i$, $c_8 = \Sigma T_i$ and:

$$g_0 = \begin{vmatrix} b_5 & b_7 \\ c_5 & c_7 \end{vmatrix}$$

$$g_1 = \frac{1}{g_0} \begin{vmatrix} b_2 & b_7 \\ c_2 & c_7 \end{vmatrix}$$

$$g_2 = \frac{1}{g_0} \begin{vmatrix} b_3 & b_7 \\ c_3 & c_7 \end{vmatrix}$$

$$g_3 = \frac{1}{g_0} \begin{vmatrix} b_8 & b_7 \\ c_8 & c_7 \end{vmatrix}$$

$$h_1 = \frac{1}{g_0} \begin{vmatrix} b_5 & b_2 \\ c_5 & c_2 \end{vmatrix}$$

$$h_2 = \frac{1}{g_0} \begin{vmatrix} b_5 & b_3 \\ c_5 & c_3 \end{vmatrix}$$

$$h_3 = \frac{1}{g_0} \begin{vmatrix} b_5 & b_8 \\ c_5 & c_8 \end{vmatrix}$$

Knowing M it follows that:

$D = g_3 - M'g_1 - Mg_2$ $P = h_3 - M'h_1 - Mh_2$

Since the functions in M, P' and D are periodic, equation (12) is a forced Hill equation for which a periodic solution may be gained as the result of the least squares method disclosed herein. This method allows the use of redundant data which tends to average out the effects of measurement errors and noise. It should be noted that a sufficient condition for a solution to exist in this case is that some subset of the data used must satisfy the condition of equations (2) and (3). Further reduction of error content in the data may be obtained as disclosed herein by averaging the data obtained at the same point in the mechanical cycle of the machine under the same conditions of torque and power transfer shaft angular velocity in separate machine cycles. Data collection for the least squares formulation method disclosed herein requires measurements to be taken throughout the entire machine mechanical cycle, wherein the frequency of measurement within an operating cycle is dependent upon the desired resolution in the solution.

In most large displacement machines the effective inertia term M is not constant. In such a case the derivative thereof, M', is indicative of the rate of change of the effective inertia and is therefore non-zero. Therefore M' may be expressed as follows:

$$M' = \frac{dM}{dq} = f(q)$$

A third variation of the method for accomplishing single degree of freedom mechanical system identification involves an expansion of equation (1) which results in:

$$M(\dot{q}^2)' + N\dot{q}^2 + D\dot{q} + P = T \quad (13)$$

Where: Ideally $N = M'$, but here N is considered as an independent $f(q)$ which is the effective rate of change of effective inertia.

In this method of machine characteristic identification both torque T and power transfer shaft angular velocity $\dot{q}$ are measured at arbitrary known angles q in subsequent mechanical cycles of the machine. Data may be taken at one specified angular position (provided $\dot{q}'$ is somehow obtainable) or may be taken at multiple predetermined angular positions throughout a machine operating cycle. Four independent measurements must be taken at each specific angular position. The condition for independent measurements is best expressed as follows:

$$\begin{vmatrix} \dot{q}_1{}^{2'} & \dot{q}_1{}^2 & \dot{q}_1 & 1 \\ \dot{q}_2{}^{2'} & \dot{q}_2{}^2 & \dot{q}_2 & 1 \\ \dot{q}_3{}^{2'} & \dot{q}_3{}^2 & \dot{q}_3 & 1 \\ \dot{q}_4{}^{2'} & \dot{q}_4{}^2 & \dot{q}_4 & 1 \end{vmatrix} \neq 0 \qquad (14)$$

Further, the measured quantities must be locally monotonic. This characteristic relates to the mechanical structure where the measurements are being taken and requires that q (power transfer shaft angular position) have the same sense (direction) of motion during each of the subsequent cycles in which measurements of T and $\dot{q}$ are accomplished. As a consequence of the aforementioned four independent measurements, four equations are obtained in the four unknowns, whereby solutions may be obtained for the unknowns M, N, P' and D. These solutions may be specific for the angle at which the independent measurements of data are made. It may therefore be seen that this third disclosed method is not restricted to data observed through the entire mechanical cycle. Further, the excitation of the machine (T and $\dot{q}$) may be periodic or may be aperiodic.

A least squares procedure may be used for reducing error content in solutions using this third described method, where more than four sets of data have been obtained, and where some subset of the four sets satisfies the determinant condition of relationship (14) (an extension of relationship (2)). Alternatively error content in the solution utilizing this third variation of the disclosed method may be reduced by repeating measurements at similar conditions and the same shaft angle (non-independent) and averaged to obtain one of the four required independent measurements of T and $\dot{q}$. Solutions are obtained for the four unknowns M, N, D, and P' from the four independent equations obtained from measurements of T, $\dot{q}$ and q by Cramer's rule or by an appropriate program equivalent thereto and executed by a computer, i.e. microprocessor 20, in receipt of the data.

FIG. 1 in the drawings is a diagrammatic showing of a system for implementing the disclosed method. A motor 10 has an output shaft 11 which is connected to the input side of an infinitely variable transmission 12. The transmission has a manual control lever 13 which, in accordance with settings to predetermined positions, provides transmittal of predetermined speed ratio to a transmission output shaft 14. The output shaft from the infinitely variable transmission is coupled to a torque sensor 16 (T) which is in turn coupled to a device 17 for measuring shaft angle q and shaft rotational speed $\dot{q}$. A single degree of freedom holonomic system or machine 18 has a machine power transfer member (or shaft in this instance) 15 which is coupled to and driven by the shaft 14. The machine 18 has characteristics M(q), M'(q), P(q) and D(q) which represent the kinetic energy, first derivative of kinetic energy (related to variation in inertia), potential energy and dissipation function respectively.

Mechanical linkage shown at 19, which may consist of appropriate cams, gears, linkage, etc., is shown disposed between the transmission output shaft and the manual transmission control 13. The purpose of such a manual feedback path is to control the output shaft 14 to provide periodic output from the transmission coupled to the power transfer member 15 on the machine 18. In this fashion any mechanically coupled oscillation from the transfer member 15 to the transmission 12 is periodic and is in synchronism with the power transfer member.

An alternative to the use of the mechanical feedback path 19 is shown as a feedback path for the signals from the torque measurement device 16 and the angle and angular velocity measurement device 17. The signals indicative of the quantities T (q), q(q) and q are delivered to a microprocessor 20 which is in communication with a signal responsive control portion 21 on the infinitely variable transmission 12. The transmission has a switch 22 which may be alternatively positioned in a manual and an automatic position as shown. With the switch in the manual position the manual control lever 13 dictates the torque and shaft speed at the output shaft 14 as a function of the torque and the speed of the motor shaft 11 at the input side of the transmission. With the switch 22 in the automatic position, a programmed variation in power or torque T or angular velocity $\dot{q}$ is obtained in the transmission output shaft 14, and therefore at the power transfer member 15 for the machine 18. This variation may be periodic or aperiodic depending on the program and the desired modification of the method described herebefore which is to be used for machine analysis.

Referring now to FIG. 2 of the drawings, the aforementioned infinitely variable transmission 12 is shown which varies the ratios between an input shaft 23 and the aforementioned transmission output shaft 14. Torque sensor 16, angle and angular velocity sensor 17, microprocessor 20, transmission controller 21 and manual/automatic selector switch 22 all function as hereinbefore described for the structure shown in FIG. 1. Additionally, the input shaft 23 to the variable transmission has a flywheel 24 attached thereto. The machine in the embodiment of FIG. 2 has a contained power source (for example an internal combustion engine complying with the limitations set herein) which is internally coupled to the power transfer member 15 and thereby to the transmission output shaft 14 and the sensors for measuring torque, shaft angular velocity and angular position. The load applied to the power transfer shaft 15, and therefore the transmission output shaft 14, may be varied manually by selection of a position for the transmission manual control lever 13 when switch 22 is in the manual position as shown. Alternatively, the microprocessor 20, under control of a predetermined program, may provide transmission operation such that either a periodic or an aperiodic variation in torque T and angular velocity $\dot{q}$ appears at the power transfer member 15. In this fashion, independent measurements of T and $\dot{q}$ as a function of shaft angle, q, may be measured at a specific angle or succession of angles throughout a mechanical cycle of the machine 18. A number of such measurements may be obtained for the same shaft torque and angular velocity conditions so that the number of measurements may be averaged to reduce noise content in the measurements. Such a set of averaged measurements is considered one independent measurement for the sake of the methods described hereinbefore. A series of such independent measurements is obtained for any of the first, second or third described methods for identifying the characteristics of the machine 18 before the appropriate steps toward solution of the machine characteristics are undertaken.

It may be seen from the foregoing that investigation of machine characteristics may be undertaken while the machine is functioning in a transient mode. Such an investigation may also be undertaken while the machine is operating in a periodic mode. Consequently, machine characteristics may be obtained either by driving a machine through its accessible power transfer member 15, or by loading such a power transfer member on a machine having a contained power source, such as an internal combustion engine. Identification of machine characteristics may serve an analytical purpose, whereby verification of predicted characteristics may be obtained, or may be used for the purpose of diagnosing the current functional character of the machine. Additionally, machine characteristics relating to kinetic energy, potential energy, variation in inertia and dissipation functions may be used for on-line monitoring of mechanical systems. Further, such identification or monitoring may be undertaken without restriction to periodic operating conditions, so that transient torque and angular velocity at the power transfer member 15 may be used in performing the methods described herein.

It should be noted that where used herein the term torque makes reference to a quantity which may be converted to torque. A similar note is directed to the use of terminology for all other measured and computed quantities discussed in this disclosure.

Although the best mode contemplated for carrying out the present invention has been herein shown and described, it will be apparent that modification and variation may be made without departing from what is regarded to be the subject matter of the invention.

What is claimed is:

1. A method of analyzing the characteristics of a cyclical machine having an accessible power transfer shaft comprising the steps of driving the machine through a series of operating cycles, measuring torque and angular velocity at the power transfer shaft during separate cycles of operation of the machine, collecting data during the operating cycle at the power transfer shaft for a predetermined number of the aforementioned measurements, and effecting a solution in the coordinate domain for machine kinetic energy, potential energy and dissipation functions using the collected data.

2. The method of claim 1 wherein the step of driving comprises imposing a periodic variation in the shaft torque and angular velocity.

3. The method of claim 1 wherein the step of driving comprises imposing an aperiodic variation in the shaft torque and angular velocity.

4. The method of claim 1 wherein the step of collecting data comprises averaging the collected data for repeated test conditions over a number of the machine operating cycles, whereby spurious noise portions of the data tend to cancel.

5. The method of claim 1 wherein the step of effecting a solution comprises the step of effecting a least squares formulation of the data.

6. The method of claim 1 wherein the step of collecting data comprises measuring torque and angular velocity over the entire machine operating cycle, whereby the effected solutions are general solutions expressed as functions of shaft angle.

7. The method of claim 1 wherein the step of effecting a solution comprises the step of solving for effective rate of change in effective inertia as a function of power transfer shaft position.

8. The method of claim 7 wherein the step of collecting data comprises the step of measuring torque and angular velocity and obtaining change in angular velocity with respect to angle at at least one predetermined angular position within the machine operating cycle, whereby the effected solution is specific for the at least one angular position.

9. The method of claim 7 wherein the step of collecting data comprises the step of collecting data at substantially the same power transfer shaft angle during the separate cycles of operation.

10. The method of claim 1 wherein the step of effecting a solution consists of using three torque and angular velocity data sets.

11. The method of claim 1 wherein the step of effecting a solution requires a minimum of four torque and angular velocity measurement sets.

12. The method of claim 1 wherein the step of effecting a solution comprises the steps of effecting a plurality of solutions using a plurality of collected data sets, and averaging the solutions, whereby spurious signals contained in the solutions for each function tend to cancel.

13. A method of analyzing the characteristics of a cyclical machine having an accessible power transfer member comprising the steps of operating the machine through a series of the operating cycles, obtaining data related to power transfer member force, position and velocity during separate machine operating cycles, and effecting a solution in the coordinate domain for machine kinetic energy, potential energy and dissipation characteristics utilizing the obtained data.

14. The method of claim 13 wherein the step of operating comprises imposing a periodic variation in the power transfer member force and velocity.

15. The method of claim 13 wherein the step of operating comprises imposing an aperiodic variation in the power transfer member force and velocity.

16. The method of claim 13 wherein the step of obtaining data comprises averaging the obtained data for repeated test conditions over a number of machine operating cycles, whereby noise content in the data is reduced.

17. The method of claim 13 wherein the step of effecting a solution comprises the step of effecting a least squares formulation of the data.

18. The method of claim 13 wherein the step of obtaining data comprises measuring data over the entire machine operating cycle, whereby the effected solutions are general solutions expressed as functions of power transfer member position.

19. The method of claim 13 wherein the step of effecting a solution comprises solving for effective rate of change in effective inertia as a function of power transfer member position.

20. The method of claim 19 wherein the step of obtaining data comprises measuring force and velocity and obtaining change in velocity with respect to position at at least one predetermined position within the machine operating cycle during the separate cycles, whereby the effected solution is specific for the at least one position.

21. The method of claim 13 wherein the step of effecting a solution is restricted to use of three force and velocity measurement sets.

22. The method of claim 13 wherein the step of effecting a solution requires a minimum of four force and velocity measurement sets.

23. The method of claim 13 wherein the step of effecting a solution comprises the steps of effecting a plurality of solutions and averaging the solutions, whereby noise content in the solution for each characteristic is reduced.

24. A method of analyzing the characteristics of a single degree of freedom, scleronomic, holonomic machine having a mechanical operating cycle and an accessible power transfer shaft, comprising the steps of
driving the machine through a series of operating cycles,
measuring torque and angular velocity of the power transfer shaft at predetermined angular locations thereof during separate operating cycles of the machine,
obtaining data from the aforementioned measuring step for a predetermined number of operating cycles,
solving in the coordinate domain for machine kinetic energy, potential energy and dissipation functions using the obtained data, and
reducing noise content in the solutions.

25. The method of claim 24 wherein the step of reducing noise content comprises the steps of
imposing the same torque and angular velocity characteristics throughout an operating cycle for a plurality of cycles,
repeating the measurement of torque and angular velocity during each of the plurality of cycles, and
averaging the torque and angular velocity measurements for the plurality of cycles, thereby providing the obtained data for one of the predetermined number of separate operating cycles.

26. The method of claim 24 wherein the step of reducing noise content comprises the steps of
solving in the coordinate domain for machine kinetic energy, potential energy and dissipation functions using obtained data sets from a plurality of measuring steps, and
averaging the solutions for kinetic energy, potential energy and dissipation functions.

27. The method of claim 24 wherein the step of driving comprises
imposing a periodic variation in the shaft torque and angular velocity.

28. The method of claim 24 wherein the step of driving comprises
imposing an aperiodic variation in the shaft torque and angular velocity.

29. The method of claim 24 wherein the step of solving in the coordinate domain comprises the step of effecting a least squares formulation of the data to obtain a simultaneous set of differential equations, and
solving the set of equations for the machine characteristics.

30. The method of claim 24 wherein the step of measuring comprises measuring shaft torque and angular velocity over the entire machine operating cycle, whereby the solutions are general solutions expressed as functions of shaft angle.

31. The method of claim 24 wherein the step of solving comprises the step of solving for effective rate of change in effective inertia as a function of power transfer shaft angle.

32. The method of claim 31 wherein the step of obtaining data comprises the step of measuring torque and angular velocity and obtaining change in angular velocity with respect to angular position at at least one predetermined angular position within the machine operating cycle, whereby the solution is specific for the at least one position.

33. The method of claim 24 wherein the step of solving consists of using three torque and angular velocity data sets.

34. The method of claim 24 wherein the step of solving comprises the step of using a minimum of four torque and angular velocity data sets.

35. The method of claim 24 wherein the step of solving comprises the steps of obtaining a plurality of data sets, solving for a plurality of the machine functions, and averaging the solutions, whereby noise signals included in the solutions for each function tend to cancel.

36. Apparatus for driving a substantially single degree of freedom holonomic mechanical system through a power transfer member and for sensing system characteristics, comprising
a drive motor having an output drive shaft,
variable transmission means for coupling said output drive shaft to the power transfer member,
means for sensing torque at the power transfer member,
means for detecting power transfer member drive position,
means for obtaining power transfer member driven speed,
feedback means coupled between said means for sensing torque, detecting drive position and obtaining driven speed and said variable transmission means, whereby said motor may impose distinct torque and driven speed conditions on the power transfer member.

37. Apparatus as in claim 36 wherein said variable transmission has a manual control and is infinitely variable, and wherein said feedback means is mechanically coupled between the power transfer member and said manual control.

38. Apparatus as in claim 36 wherein said variable transmission is infinitely variable and includes an automatic control, further comprising processor means coupled between said means for sensing, detecting and obtaining and said automatic control, whereby a predetermined variation of torque and speed may be imposed on the power transfer member.

39. Apparatus for determining the characteristics of a substantially single degree of freedom holonomic mechanical system having a contained power source coupled to a system power transfer member, comprising
means for providing a load coupled to the power transfer member,
variable transmission means disposed between said load means and the power transfer member,
means for sensing torque at the power transfer member, means for detecting power transfer member drive position, means for obtaining power transfer member speed, feedback means coupled between said means for sensing torque, detecting drive position and obtaining driven speed and said variable transmission means, whereby said means for providing a load may impose distinct torque and speed conditions on the power transfer member.

40. Apparatus as in claim 39 wherein said variable transmission is infinitely variable and includes a manual control, and wherein said feedback means is a mechanical coupling between said manual control and the power transfer member.

41. Apparatus as in claim 39 wherein said variable transmission is infinitely variable and includes an automatic control, further comprising processor means coupled between said means for sensing, detecting and obtaining and said automatic control, whereby a predetermined variation of torque and speed may be imposed on the power transfer member.

* * * * *